United States Patent
Roth

[11] 3,923,190
[45] Dec. 2, 1975

[54] PLASTIC CONTAINERS HAVING IMPROVED PHYSICAL PROPERTIES FABRICATED FROM A COMPOSITE BILLET

[75] Inventor: Donald J. Roth, Chicago Heights, Ill.

[73] Assignee: Continental Can Company, Inc., New York, N.Y.

[22] Filed: May 13, 1974

[21] Appl. No.: 469,486

[52] U.S. Cl. .................. 220/67; 428/424; 428/474; 428/212; 428/518; 428/520; 220/83; 264/150
[51] Int. Cl.² ..................... B65D 7/42; B32B 27/40
[58] Field of Search ....... 161/254, 190, 227, 182 A, 161/166, 252; 220/83, 67; 428/424, 212, 474, 518, 520

[56] References Cited
UNITED STATES PATENTS

| | | | |
|---|---|---|---|
| 3,463,350 | 8/1969 | Unger | 220/83 |
| 3,524,795 | 8/1970 | Peterson | 161/254 X |
| 3,578,524 | 5/1971 | Ingnell | 220/63 R X |
| 3,585,059 | 6/1971 | James | 161/254 X |
| 3,668,038 | 6/1972 | Kirk et al. | 117/29 X |
| 3,783,089 | 1/1974 | Hurst et al. | 161/166 |

*Primary Examiner*—George F. Lesmes
*Assistant Examiner*—Patricia C. Ives
*Attorney, Agent, or Firm*—Paul Shapiro; Joseph E. Kerwin; William A. Dittmann

[57] ABSTRACT

Plastic containers having improved physical properties are prepared from a composite billet having an outer peripheral area composed of a thermoplastic resin and an inner central core portion composed of the thermoplastic resin modified with a material which imparts improved physical properties such as reduced gas permeability or increased stiffness or rigidity to the resin. The composite billet is molded into a container wherein the billet core is formed into the sidewalls and bottom of the container and the peripheral portion is formed into a flexible thermoplastic flange surrounding the open end of the container which can be doubled seamed to a metal end closure without fracture.

13 Claims, 8 Drawing Figures

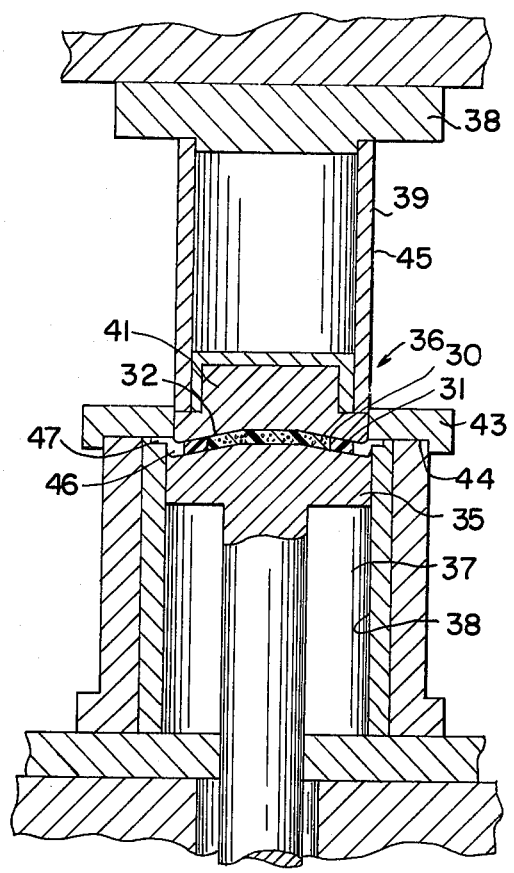
_Fig_6_
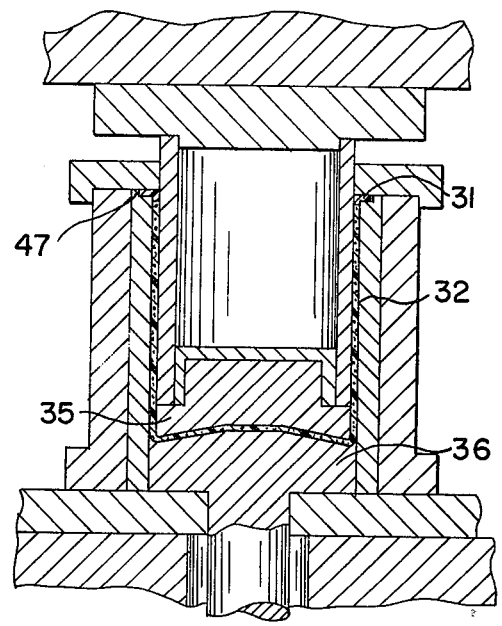
_Fig_7_
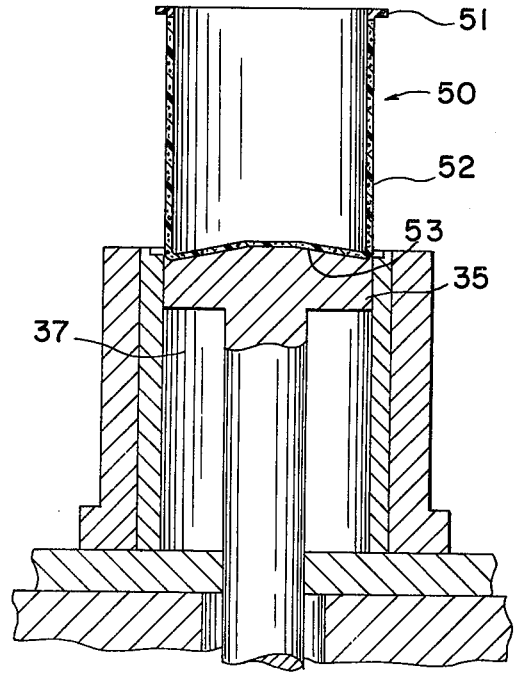
_Fig_8_

PLASTIC CONTAINERS HAVING IMPROVED PHYSICAL PROPERTIES FABRICATED FROM A COMPOSITE BILLET

BACKGROUND OF THE INVENTION

FIELD OF THE INVENTION

This invention relates to fabricating plastic containers and more particularly to fabricating plastic containers having improved physical properties.

In the manufacture of canned foodstuffs, such as meat products, as ham, corned beef hash, chili and beef stew, the containers, usually metal cans, are filled with the foodstuff, covered with a metal end closure and sealed.

One of the disadvantages of canned meat products in metal containers is that the presence of the food product may cause the interior of the can to corrode which corrosion results in contamination and deterioration of the food product.

Attempts to substitute certain inert synthetic resin material such as polyethylene and polypropylene for metal in the canning of foodstuffs have encountered the disadvantage that such resin materials are excessively permeable to gases such as oxygen and the permeation of oxygen into the container causes an undesirable discoloration and a depreciation in the taste and qualities of the foodstuff.

The high gas permeability characteristics of synthetic resins such as polyethylene has resulted in containers fabricated from such resins being rejected in the packaging of oxygen sensitive comestibles where due to the chemical inertness of the resin, it might otherwise be employed to great advantage.

In other container applications, such as in the packaging of motor oil, the sidewalls of containers fabricated from thermoplastic resins such as polyethylene and polypropylene generally do not have acceptable stiffness and rigidity to withstand buckling from loading stresses encountered when stacked during storage.

The art has devised a number of ways to reduce the gas permeability and increase the stiffness of polyethylene and other thermoplastic resins. Included in these methods is the fabrication of the container from a laminate formed from a plurality of layers of thermoplastic material, one of the layers being formed from a thermoplastic resin which exhibits high gas barrier properties such as polyvinylidene chloride, and acrylonitrile polymers, e.g. U.S. Pat. No. 3,453,173, U.S. Pat. No. 3,464,546 and U.S. Pat. No. 3,615,308. Other methods include incorporating in the thermoplastic resin a filler material such as wood flour, inorganic mineral fillers such as clay or mica, e.g. U.S. Pat. No. 3,463,350 and U.S. Pat. No.. 3,668,038 or a second resin such as nylon which has high gas barrier properties, e.g. U.S. Pat. No. 3,093,255 and U.S. Pat. No. 3,373,224. Although these prior art methods are effective in reducing the gas permeability, increasing the stiffness and other physical properties of the thermoplastic resin, serious problems are encountered when it is attempted to seal containers molded from these modified resins.

In the sealing of containers with metal end closures, formed of steel, tin plate or aluminum, the end closure is conventionally secured to the upper end of the container body by means of a double seam. In the double seaming operation, the end closure having a peripheral flange is applied to the open end of a container body which is provided with a flange integral with the container body and surrounding the open end thereof. The container flange is particularly constructed and dimensioned to receive and be interfolded with the end closure flange in a double seam to secure the closure to the container body. During the double seaming operation, the body and closure flanges are rolled together to form an interlocked double seam. During this operation, these flanges are squeezed or pressed together under considerable pressure to provide a hermetic seam. Although metal end closures may be readily double seamed to plastic containers formed from any unmodified thermoplastic resins, when these same resins are modified by lamination or admixture with other plastic resins or by the incorporation therein of fillers, containers formed from such modified thermoplastic resins lack the flexibility and resiliency to withstand the severe stresses encountered during double seaming with the result that the upper end portions of the container body are caused to fracture or crack during the double seaming operation.

SUMMARY OF THE INVENTION

In accordance with the present invention, there is provided a thermoplastic container having improved physical properties which is sealable with metal closures without fracture and is fabricated from a billet of the thermoplastic resin containing a sufficient amount of material for forming the container. The billet used is a composite material comprised of an outer peripheral portion of a thermoplastic resin and an inner central portion or core of the thermoplastic resin modified with a material which imparts the improved physical property to the resin. The composite billet is molded or otherwise formed into a container having a body portion closed at one end and a peripheral flange portion integral with the body and surrounding the open end. The body portion of the container is comprised of the modified thermoplastic resin of the billet core and the flange is comprised of the unmodified thermoplastic resin of the outer peripheral portion of the billet and is adapted to be interfolded with the flange of a metal closure to seal the open end of the container.

By the practice of the present invention, there is obtained a thermoplastic resin container having improved physical properties which can be double seamed without fracture as the flange portion of the container being subjected to the double seaming is devoid of material modification which would otherwise reduce it flexibility and render it unsuitable for sealing by double seaming. When the unmodified thermoplastic flange portion of the container is interfolded with the metal portion of the closure by the double seaming operation, this portion of the container is unavailable for the passage of gases into the container and is removed from subjection to external stresses.

DESCRIPTION OF THE DRAWINGS

FIG. 6 is the first of a series of section views showing a method for molding the composite billet of FIG. 1 into the container of FIG. 3, the billet being positioned between a pair of die members in a molding chamber prior to initiation of the molding operation.

FIG. 7 shows the die members fully advanced within the molding chamber to form a container from the billet.

FIG. 8 illustrates the separation of the die members after fabrication of the container and immediately before ejection of the container from the molding chamber.

Referring now to the drawings, FIGS. 1 and 2 show a composite billet 10 having an inner central area or core 11 formed of a thermoplastic resin modified with a material which improves the physical properties of the resin and an outer peripheral area 12 formed of unmodified thermoplastic resin.

In FIGS. 3, 4, and 5, there is shown a container 13 formed from composite billet 10 having a body 14 and an integral bottom portion 19 formed from modified thermoplastic resin derived from the core 11 of the billet 10 and an outwardly extending flange 15 formed of unmodified thermoplastic resin derived from the outer peripheral area 12 of the billet 10.

Figure 1:
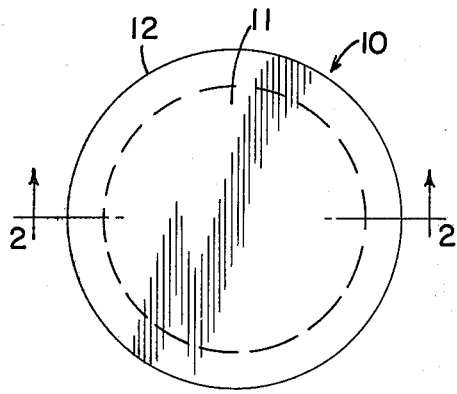
FIG. 1 is a plan view of a composite billet formed from a thermoplastic resin, the central section of which has been modified with a material which improves the physical properties of the resin.
Figure 2:
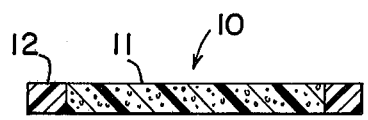
FIG. 2 is a section through line 2—2 of the billet of FIG. 1.
Figure 4:
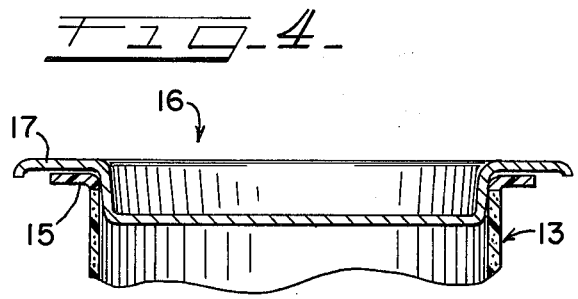
FIG. 4 is a fragmentary vertical cross-section illustrating a metal end closure applied to the container of FIG. 3 prior to commencement of a double seaming operation.
Figure 3:
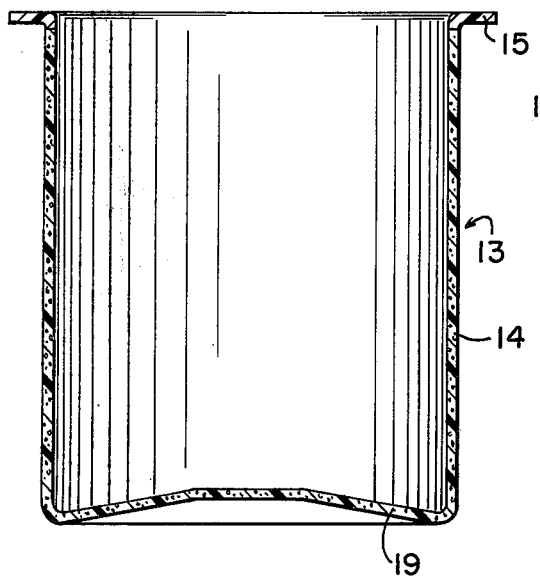
FIG. 3 is a section through a thin-walled container formed from the billet of FIGS. 1 and 2.
Figure 5:
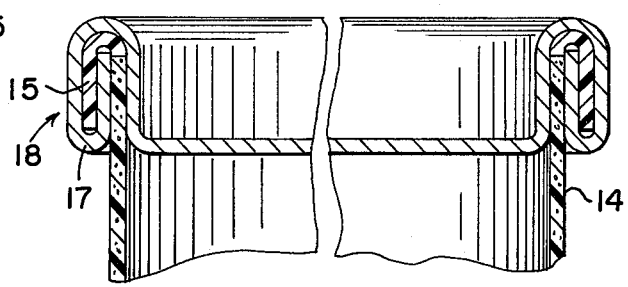
FIG. 5 is a view similar to FIG. 4 illustrating the container of FIG. 4 after the end closure has been double seamed to the container body.

A metal end closure 16 having a peripheral flange 17 is applied to the open end of the container 13. The peripheral flange 17 of the end closure 16 is interfolded with the flange 15 of the container 13 to form a double seam 18 by which the end closure 16 is sealed and joined to the container body 13. The resultant container is composed of a metal end closure 16 sealed to a container body 13 comprised of a thermoplastic resin modified to have reduced gas permeability or improved stiffness. As the unmodified thermoplastic flange 15 of the container 13 is interfolded with the impermeable metal flange portion 17 of the end closure 16, the sealed container does not have any exposed unmodified plastic portion.

Plastic containers may be fabricated from the composite billets of the present invention by any conventional molding process such as compression and impact molding.

One method to produce containers from the composite billets is to clamp the composite billet at its peripheral outer portion and gradually deform the unclamped central portion, while in a heat softened state, by forcing a plunger down on it resulting in the modified thermoplastic core material being drawn under the plunger to form the sidewalls of the container as the plunger descends.

In FIGS. 6–8 of the drawings there is illustrated a particularly advantageous method of molding composite billets into containers which method is briefly described hereinafter. A more complete description of this molding method is described in copending application Ser. No. 437,453 filed Jan. 28, 1974.

Referring now to FIGS. 6–8, a suitably shaped composite billet composed of an outer peripheral area 31 of a flexible thermoplastic resin of relatively high gas permeability or low stiffness and an inner central core 32 comprised of the thermoplastic resin modified to have decreased gas permeability or increased stiffness is placed between opposed lower die member 35 and upper die member 36, the pair of die members being adapted to advance through a molding chamber 37. Lower die member 35 is arranged to be reciprocated (by means not shown) telescopically with respect to the interior walls 38 of the molding chamber 37.

Upper die member 36 is comprised of support plate 38 having secured thereto die sleeve 39 and die cap 41 mounted and secured to the lower end of the sleeve 39.

The interior of molding chamber 37 has a predetermined transverse dimension exceeding that of the upper die 36 to permit the die sleeve 39 and the interior walls 38 of the molding chamber to be spaced from one another during the molding cycle. To provide this desired spacing, the molding chamber is provided with a ring cap 43 mounted on the upper rim 44 of the molding chamber 37. The ring cap 43 has an orifice of sufficient size for sliding contact with the outer peripheral wall surface 45 of the sleeve 39. The annular clearance between the sleeve wall surface 45 and interior molding chamber wall 38 defines a cavity 46 having the shape and dimensions desired for the sidewall of the container to be molded.

The molding chamber 38 is also provided with a peripheral groove or recess 47 formed in the interior rim portion of the molding chamber. The groove 47 is adapted to receive plastic material displaced therein during the molding operation from the outer peripheral unmodified thermoplastic resin portion 31 of the composite billet 30 to form the seaming flange of the molded container.

As shown in FIG. 6, the composite billet 30 is placed on the surface of the lower die 35 raised to a first position at the upper rim 44 of the molding chamber. If desired, the billet 30 may be heated to a uniform forming temperature by suitable heating means (not shown) prior to its being positioned on the die member 35.

As shown in FIG. 7, the billet is compressed between the die members 35, 36 to cause the outer portion 31 of the billet to flow radially outward from between the die members and extruded into groove 47 to form the flange portion of the container. After exhaustion of the outer portion 31 of the billet into the groove 47, advancement of the die members 35, 36 through the chamber 37 causes a continuous layer of modified thermoplastic core material to be extruded into the cavity 46 to form the sidewalls of the container.

As shown in FIG. 8, after extrusion of the billet core material is completed by the advancement of the die members 35, 36 through the molding chamber 37, there is formed container 50 having a flange portion 51 formed of unmodified thermoplastic material and sidewalls 52 and bottom portion 53 formed of thermoplastic resin modified to have improved physical properties. Upon formation of the container 50, the upper die 36 is retracted from the molding chamber 37 to the fully opened position. The lower die 35 is advanced upwardly through the molding chamber 37 to eject the container 50 from the molding chamber 37. After ejection of the container 50, the lower die is in position to receive another composite billet and immediately repeat the molding cycle.

The containers ejected from the molding chamber are ready for immediate packaging and double seaming operations and require no trimming or other treatment after formation.

PREFERRED EMBODIMENTS

The composite billet from which plastic containers are formed in accordance with the present invention may be composed of any thermoplastic material which heretofore has been unsuitable for the manufacture of containers used for packaging applications where high stiffness or low permeability to gases such as oxygen, carbon dioxide and water vapor are required. Illustrative examples of such thermoplastic resins are polyvinyl chloride, acrylonitrile-butadiene-styrene copolymers (ABS), polystyrene and olefin polymers, such as polyethylene, polypropylene, poly-1-butene, poly-4-methyl-pentene-1, and other homopolymers and copolymers of similar mono-1-olefins having up to 8 carbon atoms per molecule.

These thermoplastic resins in substantially unmodified form, comprise the outer peripheral portions of the composite billet from which the seaming flange of the container is formed. The inner core portion of the composite billet, from which the sidewalls and bottom end of the container are formed is composed of these same thermoplastic resins modified to have reduced gas permeability or increased stiffness.

Among the means by which the thermoplastic resin may be modified to increase its stiffness or reduce its gas permeability is the incorporation in the resin of a filler material, such as natural organic fibrous materials in divided form especially wood particles such as sawdust and wood flour, mineral fillers such as $TiO_2$, $CaCO_3$, asbestos fiber, clay-like materials having a platelike or platelet structure, such as mica, vermiculite, talc as well as siliceous fillers such as silica, calcium silicate, aluminum silicate at loadings of 1% to 90% by weight which loadings will cause the desired improvement in the physical properties of the resin but will still permit compression or impact molding of the modified resin.

Alternatively or in addition to fillers there may be incorporated in the thermoplastic resin, as by blending, a second resin material which possesses low gas permeability properties, such resins including nylon, acrylonitrile/alkyl acrylate (Barax) or acrylonitrile/styrene copolymers having acrylonitrile contents of greater than 60% by weight and vinylidene chloride polymers (saran), such as polyvinylidene chloride, vinylidene chloride/vinyl chloride and vinylidene/acrylonitrile copolymers.

Alternatively or in addition to the incorporation of fillers or low gas permeable resins in the thermoplastic resin, a laminate of one or more layers the thermoplastic resin and a low gas permeable resin may be used as the material for the core of the composite billet. Thus, the billet core may consist of a laminate structure comprised of two or more sheets of a thermoplastic resin material such as polyethylene or polypropylene having interposed therebetween an inner layer of saran or Barax.

The composite billet used in accordance with the present invention can be any shape such as circular, square or polygonal and can be prepared by coextruding the unmodified and modified thermoplastic resins into a shaped structure such as a rod and then cutting the composite rod or other shaped composite structure into a billet of the desired dimensions. The actual dimensions of the composite billet will be determined by experimentation with the particular molding chamber and die member configuration and the total volume of the composite billet will be that which is sufficient to meet the dimensional requirements of the desired container.

What is claimed is:

1. A container for packaging food products comprised of a hollow body closed at one end and terminating in an upper end surrounded with a peripheral flange integral with the body and adapted to receive an end closure, the flange being formed from a thermoplastic resin and the body being formed from a thermoplastic resin modified with a second material which imparts lower gas permeability to the thermoplastic resin, the flange being devoid of the second material.

2. The container of claim 1 wherein the flange is formed from polyethylene.

3. The container of claim 1 wherein the flange is formed from polypropylene.

4. The container of claim 1 wherein the flange is formed from polystyrene.

5. The container of claim 1 wherein the container body is formed from a blend of a first thermoplastic resin having high gas permeability and a second resin having low gas permeability selected from the group consisting of vinylidene chloride polymers, nylon and acrylonitrile copolymers having an acrylonitrile content of at least 60% by weight.

6. The container of claim 1 wherein the container body is formed of a laminate of a layer a first thermoplastic resin having high gas permeability and a layer of a second resin having low gas permeability selected from the group consisting of vinylidene chloride polymers, nylon and acrylonitrile copolymers having an acrylonitrile content of at least 60% by weight.

7. The container of claim 1 wherein the container body is formed from a blend of a thermoplastic resin and a filler which imparts lower gas permeability to the thermoplastic resin.

8. The container of claim 7 wherein the filler is wood flour.

9. The container of claim 1 wherein the container body is formed from a blend of a thermoplastic resin and a mineral filler.

10. The container of claim 9 wherein the filler is mica.

11. The container of claim 9 wherein the filler is asbestos fiber.

12. The container is claim 9 wherein the filler is $CaCO_3$.

13. The container of claim 9 wherein the filler is $TiO_2$.

* * * * *